United States Patent [19]

Moncrief, Jr. et al.

[11] 4,387,434

[45] Jun. 7, 1983

[54] INTELLIGENT FIELD INTERFACE DEVICE FOR FLUID STORAGE FACILITY

[75] Inventors: Marion L. Moncrief, Jr.; Frank S. Glass, both of Stone Mountain, Ga.; Rafael Hernandez, Jimenez, Mexico; Edmund E. Chow, Lilburn, Ga.

[73] Assignee: Process Technologies, Inc., Tucker, Ga.

[21] Appl. No.: 200,382

[22] Filed: Oct. 24, 1980

[51] Int. Cl.³ .................. G06F 15/00; H04Q 1/00; G05D 9/00; G05B 15/00
[52] U.S. Cl. ................................. 364/509; 137/392; 340/870.16
[58] Field of Search ............ 364/509, 510, 550; 340/870.16, 870.17, 825.06, 620, 623; 73/307; 137/391-393

[56] References Cited

U.S. PATENT DOCUMENTS

| | | | |
|---|---|---|---|
| 4,020,488 | 4/1977 | Martin et al. | 137/392 X |
| 4,227,246 | 10/1980 | Vaughan et al. | 364/510 X |
| 4,244,385 | 1/1981 | Hotine | 364/509 X |
| 4,258,422 | 3/1981 | Dougherty et al. | 364/509 X |
| 4,275,382 | 6/1981 | Jannotta | 364/509 X |

*Primary Examiner*—Edward J. Wise
*Attorney, Agent, or Firm*—Jones & Askew

[57] ABSTRACT

An intelligent field interface device for use in a fluid storage facility is disclosed. A bidirectional standard serial communication bus (20) provides communication between a plurality of the interface devices (17) and a central location (18). Surge and lightning protection (50, 51) as well as a high degree of electrical and magnetic isolation (45) are provided between the power supplies of the system. Each device includes a local one chip microcomputer (35) which has a field set address (56) and communicates through optoisolation (27) with the bus through a UART (28). Analog multiplexing (40) of RTD outputs (176-179) or outputs of other transducers (162) is provided to a local to analog to digital converter (36) so that all measured tank parameters may be transmitted digitally back to the control location. An arrangement for both testing and operating a motor operated valve (110) through a two-wire circuit (141, 132) including a limit switch (119) is also shown.

5 Claims, 8 Drawing Figures

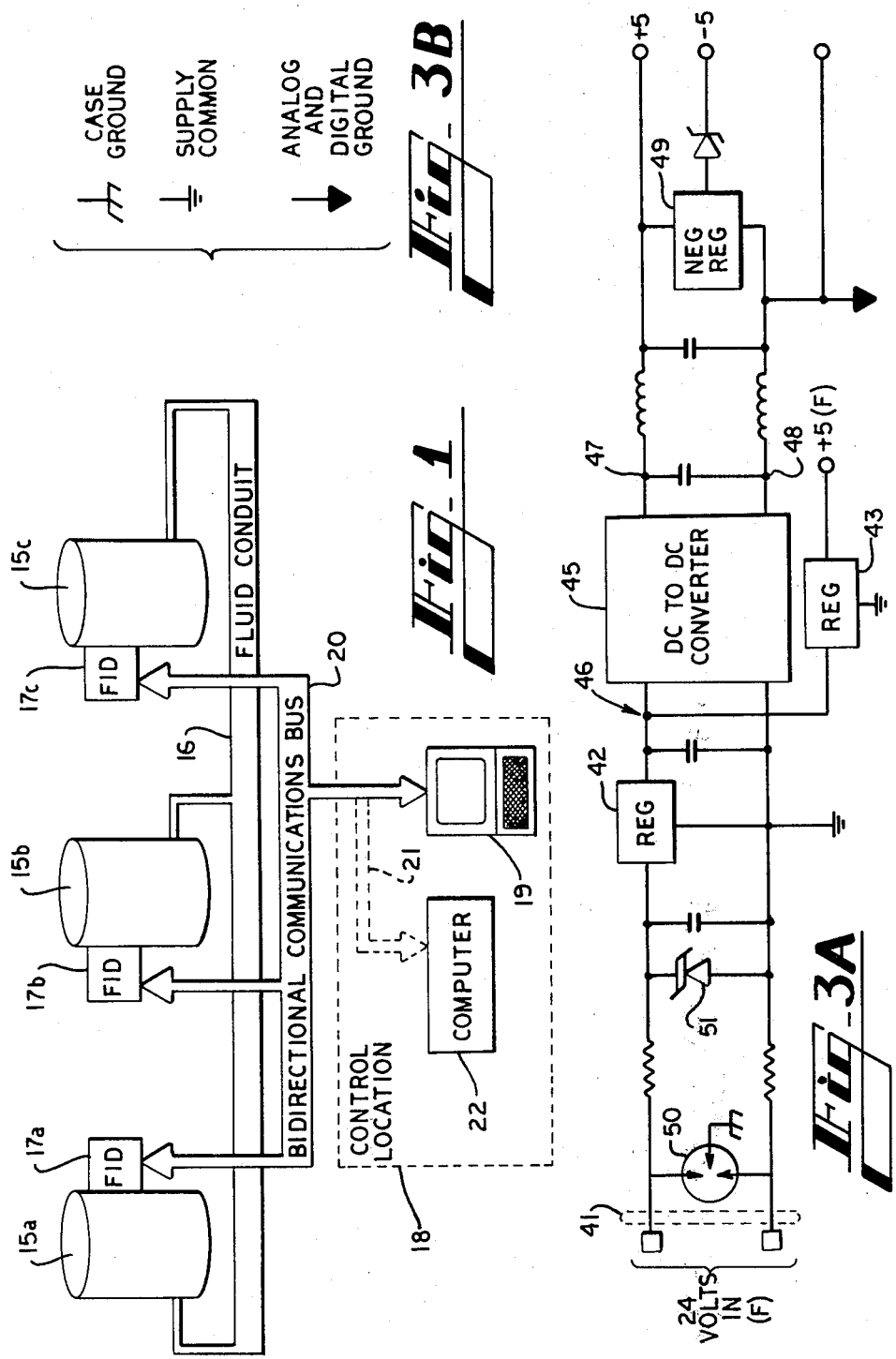

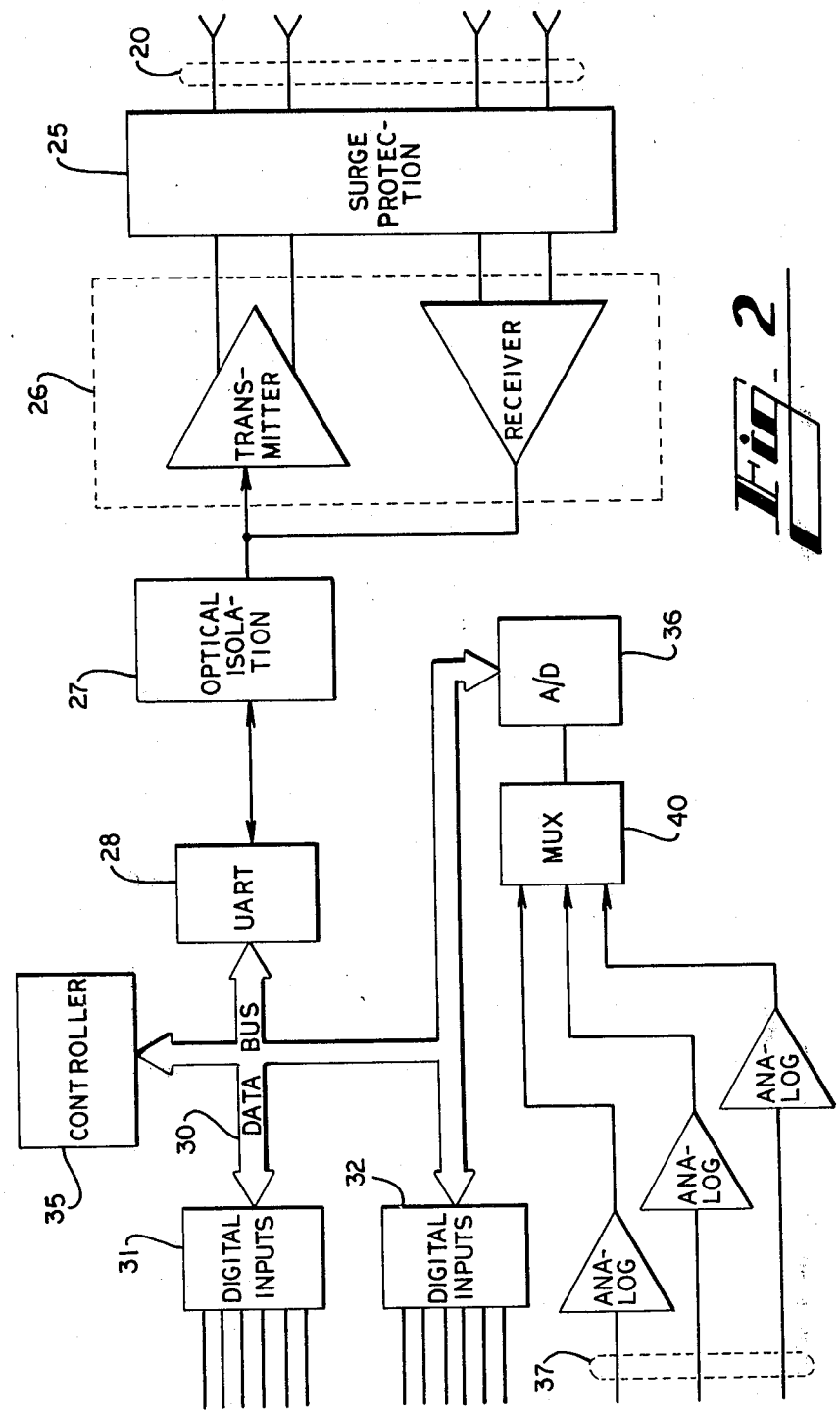

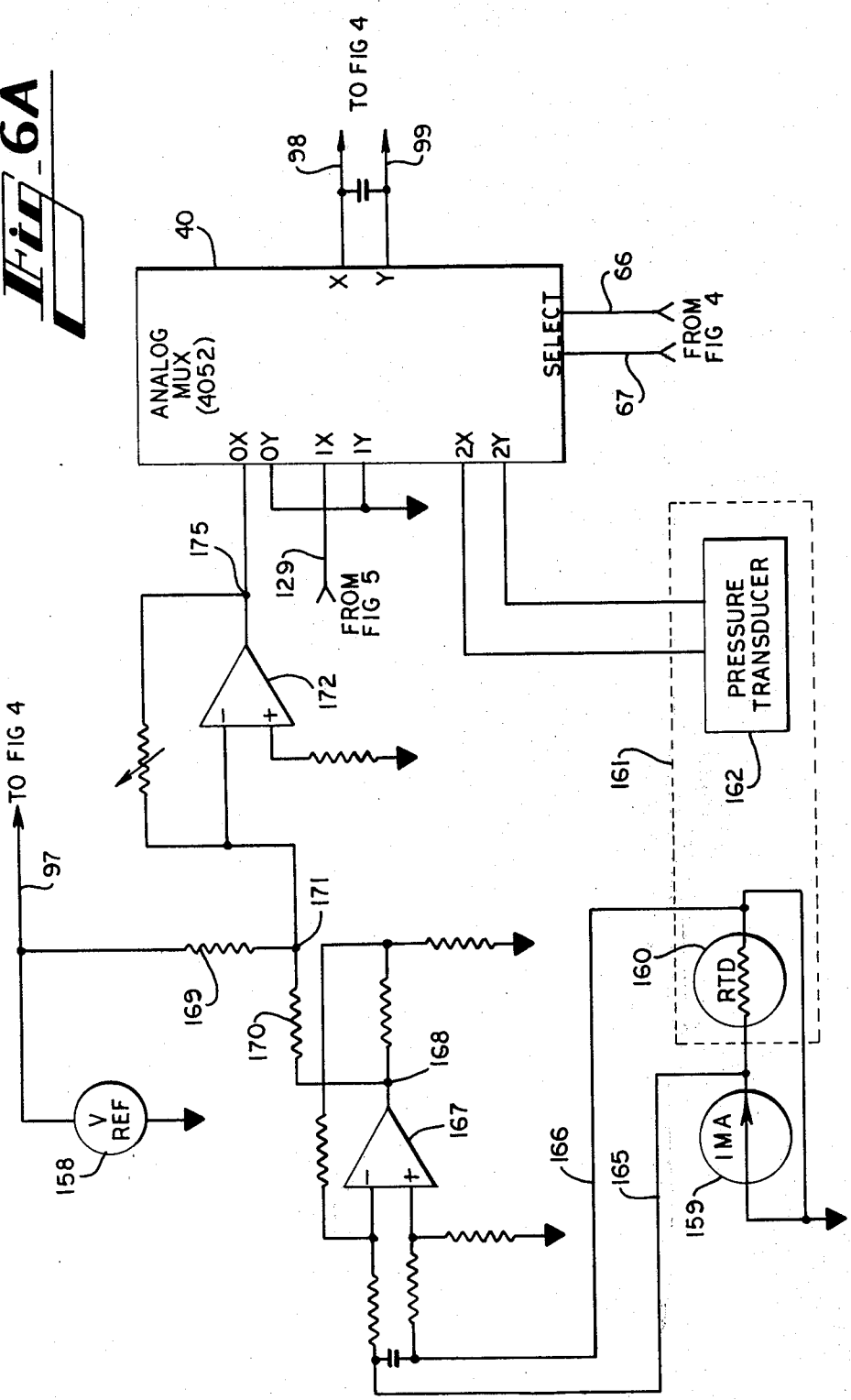

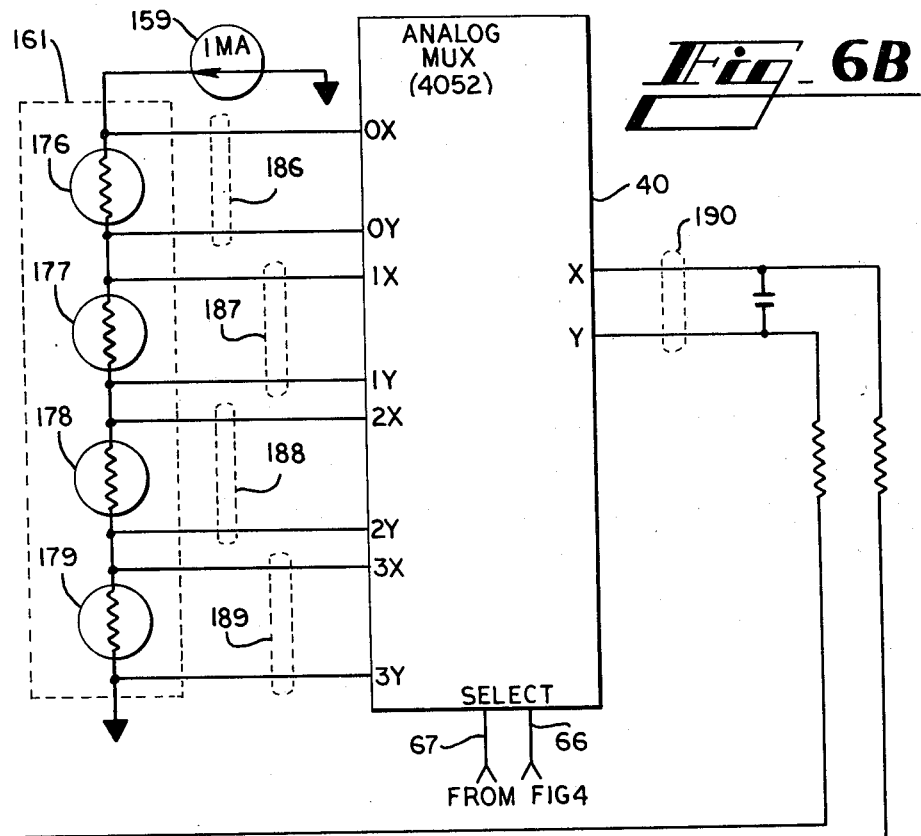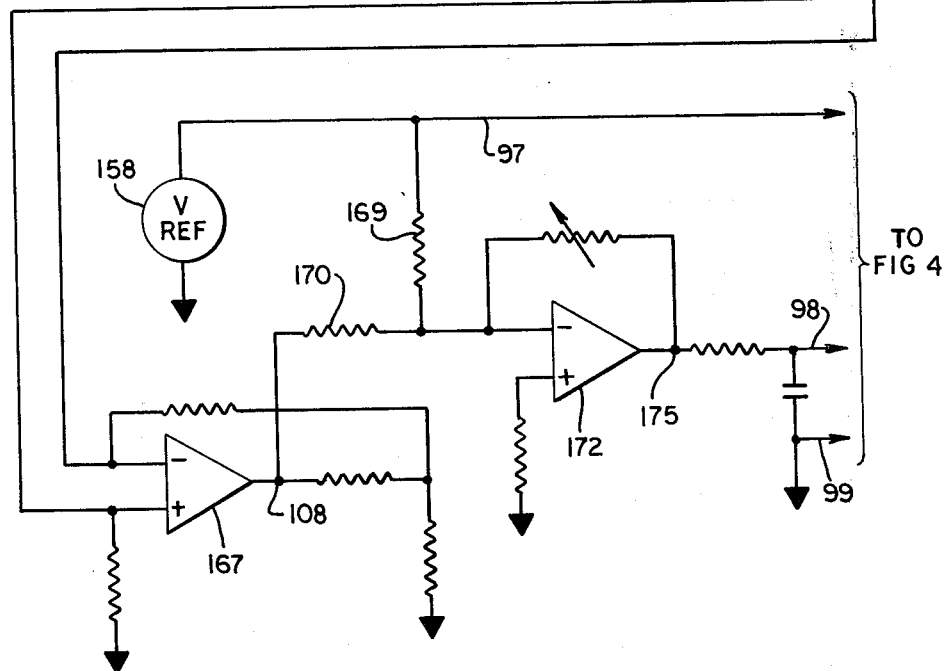
Fig. 6B

INTELLIGENT FIELD INTERFACE DEVICE FOR FLUID STORAGE FACILITY

TECHNICAL FIELD

The present invention relates to monitoring and controlling a plurality of tanks in a multitank distributed fluid storage facility, in particular of the type used for storing petroleum products.

BACKGROUND OF THE INVENTION

The great proliferation of the automobile in the last sixty years has given rise to a corresponding proliferation of facilities for storing fuel for automobiles. The increasing use of long distance pipe lines facilities for transporting petroleum products as well as the need for distributing petroleum products in urban areas has led to the establishment of fluid storage facilities commonly called tank farms. In such a facility a plurality of tanks are interconnected by a series of pipes comprising a fluid conduit which in turn is interconnected as a terminal or distribution point from a long distance pipe line and is further interconnected with stations for transferring the stored products to over-the-road vehicles for local distribution.

In such facilities, particularly tank farms which terminate the receiving end of long distance high volume pipe lines, it is necessary to monitor and control the level of fluid in each tank as well as to monitor other parameters of the tank including internal pressure and temperature.

In modern petroleum facilities it is particularly important that the systems for monitoring and controlling fluid flow and tank parameters be very reliable since the failure to properly ascertain these quantities can lead to gasoline or other petroleum product overflows which are both expensive and dangerous. Several significant fires at petroleum tank farms have occurred recently in this country under conditions which began with an overflow of a particular tank which was not properly monitored and controlled.

Heretofore most monitoring of tank parameters, such as internal pressure, temperature of the fluid and fluid level have been monitored by field interface devices (FID)s which include a float actuated level indicator and a resistance temperature device (RTD) for ascertaining fluid level and temperature.

Prior art systems have transmitted analog signals from multiturn potentiometers and analog signals from the RTDs over relatively long cable runs back to a central monitoring location. Due to the resistive losses in the long cable runs and the dependence of these losses upon the length of line from the particular tank to the central location, resolution of such prior art systems was relatively poor.

Furthermore, operation of electromechanical fluid control devices associated with the tanks such as motor operated valves, pumps and the like was accomplished by human response to the monitoring outputs wherein the human operator had to activate a separate set of controls associated with the fluid control devices in order to open or close valves or operate pumps at a particular tank.

More recently float level indicators attached to mechanically drive a shaft connected to a shaft angle encoder have been used to monitor the level of fluid in a storage tank. One prior art system has used a pair of mark and space data lines running to each tank to transmit the output of the shaft angle encoder back to a monitoring central location. Such a system requires a dedicated pair of mark space data lines for each tank and furthermore requires that data decoding be accomplished at the monitoring location.

It has been found through experience in working with multitank fluid storage facilities that it is often desirable to measure the temperature of the fluid at differing levels in the tank depending upon the height of the fluid stored within the tank. The prior art has accomplished such a measurement by providing an array of RTDs vertically spaced within the tank, each of which may be connected, one at a time, to the circuit carrying the temperature information back to a monitor. Prior art systems have used float actuated trip switches which mechanically throw a set of switches to connect the appropriate RTD to the data transmission line as the level of fluid in the tank changes. Such a system has the drawback of the inherent lack of reliability associated with a mechanical device as well as the inability to select a working RTD should the RTD selected by the float arrangement fail.

More recently remote storage tank gauging system have been introduced which include apparatus at each tank for performing an analog to digital conversion of the output of an RTD and for transmitting the digital output back to a monitoring location.

Heretofore the control and monitoring of the status of electromechanical fluid control devices such as pumps and motor operated valves has been actuated either locally at each tank or at certain sets of tanks within a larger tank farm or has been accomplished at separate control stations at the remote location where the monitoring of tank parameters takes place.

One of the reasons for the separation between the monitoring systems and the fluid control device systems of prior art remote storage tank facilities has been the difference in the power supply requirements for these systems. Conventionally the fluid control devices are operated through systems including 24 volt or 48 volt relays and the power supplies associated therewith have been of too high a voltage or too unstable to derive proper supply voltages for digital circuitry. Heretofore the prior art has not provided a combined monitoring and control apparatus for use in a multitank fluid storage facility which at one control point both integrates the functions of monitoring tank parameters and controlling fluid control devices. Furthermore, prior to the present invention, it has not been known to interface these devices without creating power supply problems and also to provide immunity from environmental transients and noise, including lightning strikes near the storage facility.

SUMMARY OF THE INVENTION

The present invention comprises an integrated remote storage tank gauging and control system which allows for monitoring of a plurality of tank parameters at a remote control location as well as operation of electromechanical fluid control devices at the tanks from the same remote control location using the same input/output device and the same bidirectional communication link over which the tank parameter data is supplied.

The present invention comprises an intelligent field interface device for location at each tank in a multitank fluid storage facility which monitors the output of tank parameter transducers (such as temperature, pressure, and level), locally converts all analog transducer outputs to digital data and transmits same back to the control location.

Furthermore the field interface device of the present invention by a novel arrangement can both monitor and control the status of electromechanical fluid control devices over a two-wire circuit for control of the devices which will be found on many tanks in existing facilities.

All data transmitted from the FID and all commands received by the FID are transmitted in a predetermined code, preferably United States ASCII code (ANSI X3.4-1968) thus allowing the entire tank facility to be monitored and operated at the control location by a "dumb" terminal. Of course it is possible to also provide computer intelligence at the control location.

It is an object of the present invention to provide novel apparatus resident within the intelligent field interface device which may be easily retrofitted to existing fluid control devices which will monitor the status of these devices and control them over a conventional pre-existing two-wire control circuit for such devices.

It is a further object of the present invention to provide apparatus in a field interface device which can electronically multiplex and average the temperature indication from a plurality of temperature transducers spaced vertically within a fluid storage tank and which can selectively ignore the output of particular transducers which are out of range, indicating that the particular transducer has suffered a failure.

It is still a further object of the present invention to provide a field interface device for use in a remote gauging and control facility for fluid storage tanks which is extremely insensitive to environmental noise and transients, including lightning strikes, and transients within pre-existing field power supplies within a tank farm.

It is still a further object of the present invention to provide apparatus for use in a remote tank gauging and control facility which interconnects apparatus operating from conventional field power supplies and apparatus controlled by well regulated power supply for the digital and analog circuitry for the field interface device and, at the same time, provides both electrical and magnetic isolation between the various power supplies so that transients on the order of thousands of volts occurring between the respective power supplies will not damage or destroy the system.

These and other objects of the present invention will become apparent from a detailed description of the preferred embodiments below.

BRIEF DESCRIPTION OF THE DRAWINGS

FIG. 1 is a block diagram of a tank farm including a control engaging system built around the intelligent field interface device of the present invention.

FIG. 2 is a block diagram of the field interface device of the present invention.

FIG. 3A is a schematic diagram of the power supply system of the present invention.

FIG. 3B defines the ground symbols for various grounds of the power supplies shown throughout the drawings.

FIG. 6A is a schematic of a first preferred embodiment of a transducer multiplexing circuit of the present invention.

FIG. 6B is an alternate preferred embodiment for a transducer multiplexing circuit for the present invention.

DETAILED DESCRIPTION

Figure 4:
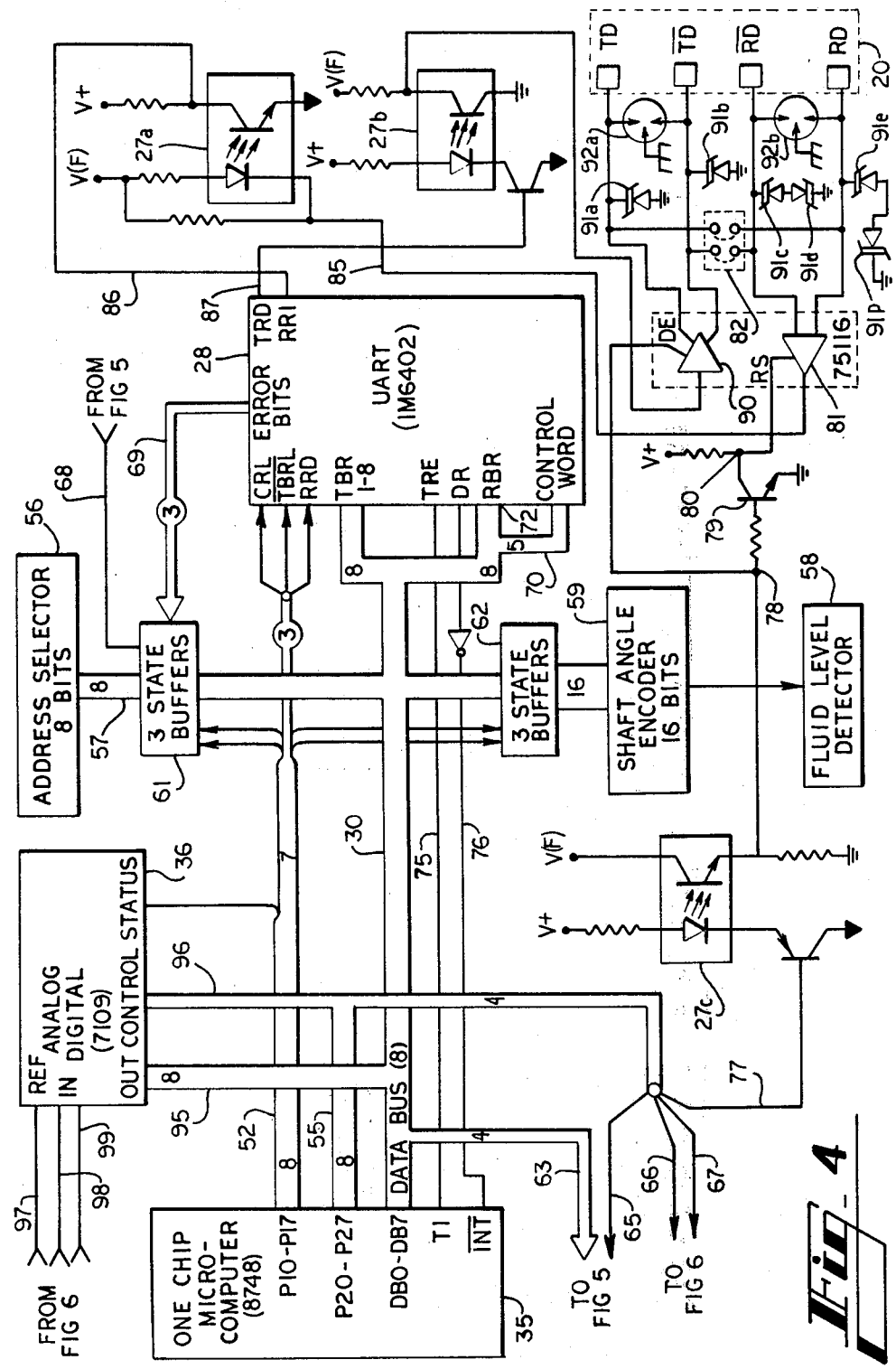
FIG. 4 is a schematic diagram of the controller and the data communication link to the common communication bus of the preferred embodiment of the present invention.

The novel features of the present invention which fulfill the objects set forth above will be appreciated by reference to the figures in which like numerals represent like elements.

Turning first to FIG. 1, a block diagram of the environment of the present invention may be seen. The present invention is designed for use in a multitank fluid storage facility comprising by example, three tanks 15a–15c. As noted hereinabove, the specific use contemplated for this invention is in the environment of tanks for storing petroleum products but of course other fluids may be stored in tanks equipped with the present invention.

Each of tanks 15a–15c is interconnected by a conventional fluid conduit system 16 for replenishing and depleting the contents of each tank. It is to be understood that the interface between each of tanks 15 and fluid conduit 16 will conventionally be equipped with electromechanical fluid control devices (not shown) which may be electric pumps, motor operated valves, or some combination thereof.

Each of tanks 15a–15c is equipped with one of intelligent FIDs 17a–17c of the present invention. It is to be understood that FID 17 will be connected to conventional float level indicators (not shown), conventional temperature transducers such as RTDs (not shown), and conventional pressure transducers (not shown).

Each of FID 17 is connected to a common bidirectional communications bus 20 which in turn is connected to apparatus at a control location 18. As shown in FIG. 1, a single terminal 19, which may be a dumb terminal, can be used with the preferred embodiment of the present invention for all monitoring and control functions described herein.

It is also possible to connect communications bus 20 via a branch shown in phantom as 21 to a computer 22 which may be programmed to operate the fluid control devices of tanks 15 and to respond to the monitoring data provided by FID 17 on communications bus 20.

It is to be understood that the arrangement of the present invention allows for all data and instructions on communications bus 20 to be transmitted serially in standard ASCII code. The present invention is further arranged so that communications bus 20 and the interfaces thereto may be constructed according to EIA standard RS-422-A. The preferred embodiment of the present invention may also easily be arranged to provide a data communication bus 20 and interfaces thereto which comply with EIA standard RS-232 or other full duplex or half duplex arrangements.

It should be understood that each of FIDs 17 is addressable and therefore the entire system may be interconnected via communications bus 20 which may comprise a two-wire or four-wire circuit linking the entire system shown in FIG. 1.

Turning next to FIG. 2, a block diagram of the intelligent field interface device (FID) of the preent invention may be seen. Bidirectional communication bus 20 is shown as a full duplex bus connected through a surge protection network 25 to a full duplex differential line transceiver 26. As will become apparent from the description below, the embodiments of the present invention may be constructed which are either full duplex or half duplex without departing from the scope of the invention.

Line transceiver 26 is connected to a universal asynchronous receiver/transmitter (UART) 28. UART 28 controls the flow of data between bidirectional communications bus 20 and internal data bus 30 of the FID.

Data bus 30 interconnects a controller 35 with a set of digital inputs 31 and digital outputs 32.

Data bus 30 is also connected to an analog to digital converter 36 which has as its analog input, the output of an analog multiplexer 40. Multiplexer 40 has as its inputs a plurality of analog signals appearing on lines 37 which will be understood to carry the outputs of various transducers associated with one of the storage tanks.

Before proceeding to a detailed description of the FID, the surge protection and isolation arrangement of the power supplies used with the preferred embodiment of the present invention will now be explained. As noted hereinabove, it is the novel isolation and surge protection arrangement in the power supplies of the present invention which allows the interconnection of both monitoring and operating devices and the FID and at the same time effectively isolates the system subcomponents from each other in a manner which greatly increases the total system reliability.

Turning now to FIG. 3A, the preferred embodiment of the power supply for the present invention may now be seen. It is to be understood that the preferred embodiment of the present invention uses four basic types of isolation and surge protection devices: gas filled tubes, transzorbs, optocouplers, and DC to DC converters.

In FIG. 3A, at the lefthand side thereof, it may be seen that an input port 41 for accepting a conventional field supply input is provided. It will be appreciated by those skilled in the art that existing tank farms are conventionally supplied with a DC supply in the field usually of 24 or 48 volts. On the figures herein it is to be understood that an indication of a voltage supply followed by the notation "(F)" indicates that the source is on the field side of the power supply shown in FIG. 3A.

The input from port 41 is regulated by a conventional integrated circuit three terminal regulator 42 which provides a regulated input voltage to DC to DC converter 45 and further provides input to a second conventional three terminal regulator 46 which provides the five volt field supply for the embodiment shown.

FIG. 3B shows the notation used in the drawings to represent various types of grounds within the system. As may be seen in FIG. 3B, three types of grounds are interconnected in the preferred embodiment: the case ground which will conventionally be a truth earth ground and will be the common point for the metal housings containing various components of the present invention and the tank farm; the supply common which is the ground reference point for the supply shown in FIG. 3A on the input side of converter 45; and the analog and digital ground which is the ground reference for the analog and digital circuitry of the field interface device of the present invention and is electrically and magnetically isolated from the field supply by converter 45.

It will be appreciated by those skilled in the art that DC to DC converter 45 is a conventionally available component which magnetically isolates its input port comprising point 46 and the supply common and its output point at points 47 and 48.

A conventional integrated circuit negative regulator 49 on the output side of converter 45 also supplies a negative five volt supply for components of the FID which require same.

As may be seen, at input port 41 on the field supply side of the supply shown in FIG. 3A, a gas filled tube 50 provides surge protection between both sides of input port 41 and the case ground of the present system. It will be appreciated by those of ordinary skill in the art that such gas filled tubes will conduct upon the occurrence of a condition of a predetermined voltage existing between any pair of terminals of the tube. As is known, the mechanism for conduction is the ionization of gas within the tube which causes current to flow once the voltage threshold has been reached. In the preferred embodiment ionization voltages on the order of 150 volts are used in the gas filled tubes shown therein.

The input to regulator 42 is also protected by a transzorb 51. It will be appreciated by those skilled in the art that transzorbs are conventionally available transient suppression devices which will absorb very large power surges in the event of a voltage spike appearing across its terminals. For example, available transzorbs may absorb spikes having peak pulse powers on the order of fifty kilowatts and a duration of a microsecond. It should also be understood that such devices will "turn on" within approximately one nanosecond of the application of the spike between its terminals.

It has been found in testing of embodiment of the present invention that the combiation of gas tubes such as tube 50 and transzorbs such as device 51 will protect the preferred embodiment of the present invention under extreme environmental conditions designed to approximate a lightning strike near a tank.

Turning now to FIG. 4, a schematic diagram of a portion of the preferred embodiment of the field interface device of the present invention may be seen. The various bus structures shown on FIG. 4 include numerical indications in parenthesis of the number of lines at each portion thereof.

In relating the elements shown on FIG. 4 to the block diagram of FIG. 2, it should be noted that UART 28 is embodied by a type IM6402 currently manufactured by Intersil Inc. of Cupertino, Calif. The preferred embodiment of the controller 35 of the present invention is shown on FIG. 4 as a type 8748 one chip microcomputer currently manufactured by Intel Corporation of Santa Clara, Calif. As will be appreciated by those skilled in the art, the type 8748 is a one chip eight bit microcomputer having a 1K×8 bit erasable programmable read only memory resident therein. The microcomputer also includes a sixty-four word random access memory on the chip. Data bus 30 is connected to the data bus port, pins DB0–DB7 of controller 35. The type 8748 also includes a pair of eight bit quasi bidirectional ports designated as P10–P17 and P20–P27.

In the preferred embodiment of the present invention, the first quasi bidirectional port is connected to a bus designated 52, the basic function of which is to control traffic on data bus 30 and to control communication between UART 28 and bidirectional communication bus 20.

The second quasi bidirectional port, P20-P27, is connected to an eight bit bus 55, the basic function of which is to control the analog to digital conversion processes described in detail hereinbelow.

In a tank gauging and control system using a plurality of field interface devices constructed according to the preferred embodiment of the present invention, each field interface device characterized by an eight bit address defined by address selector 56. It will be appreciated that address selector 56 may be a combination of jumpers and pull up resistors, switches or any other conventional means which may be set in the field to define an eight bit word which will appear on eight lines designated as 57. It will further be appreciated that for each address appearing on bidirectional communication bus 20 which is received by UART 28 and eventually loaded from data bit 30 into controller 35, that the software of the controller will test that address against the address defined by address selector 56 to determine if particular instructions are intended for that particular FID.

Also shown in FIG. 4 as block 58 is a conventional fluid level detector arrangement which will be understood to be a float positioned somewhere within the tank associated with the particular FID shown in FIG. 4. This float will mechanically drive a rod connected to a geared arrangement for driving a shaft. The output of the shaft is connected to a shaft angle encoder 59 which will be understood to provide a sixteen bit gray code output indicative of the level of liquid in the tank. Combination of fluid level detector 58 and shaft angle encoder 59 is known in the art and these components are available as off-the-shelf items.

The outputs of address selector 56 and shaft angle encoder 59 are connected to data bus 30 through sets of three state buffers 61 and 62, respectively. As may be seen from the drawing, two lines each from bus 52 control whether sets of three state buffers 61 and 62 are in their high impedance state or connect the respective inputs from the sets of buffers to data bus 30. It will be apparent that controller 35 is programmed so that only eight bits at a time are connected to bus 30 with the remaining outputs connected to the bus being placed in a high impedance state.

Three state buffers 61 also connect the three error indication bits shown as three bit bus 69 from UART 28 as well as line 68 to data bus 30. The function of line 68 will be explained in detail hereinbelow in connection with FIG. 5.

The three remaining bits from bus 52 control the CRL, the negated TBRL, and the RRD inputs to UART 28. The symbols for these inputs on UART 28 are in conformance with those promulgated by Intersil Inc., the manufacturer of the type IM6402 UART. It will be appreciated that the above recited inputs control loading of the transmit, receive, and control registers within the UART. The control register for UART 28 comprises five input bits shown as a five bit tap 70 to data bus 30 to an input labeled control word on UART 28.

Two eight bit buffered ports 71 and 72 are the transmit buffer and receive buffer for UART 28 and both are connected to data bus 30.

Two other direct connections between UART 28 and controller 35 are provided along lines 75 and 76. Line 75 connects the transmit register empty (TRE) output of UART 28 to one of the testable inputs (TI) of the 8748 controller and the negated form of the data received (OR) output of UART 28 (indicating that a complete received word has been read into the receive buffer) is connected to the negated interrupt (INT) input of controller 35. It will thus be apparent that controller 35 will have its routine interrupted upon an indication from UART 28 that a complete word has been received from bidirectional communication bus 20 and furthermore that the control program for controller 35 can periodically test line 75 to ascertain whether the last word loaded into the transmit buffer has been transmitted.

The block noted as optical isolation element 27 on FIG. 2 manifests itself as three optocouplers 27a-27c on the preferred embodiment shown in FIG. 4. Optocouplers 27 serve to isolate the "side" of the FID connected to the analog and digital power supply from the side of the FID connected to the field supplies. In this case the digital circuitry on FIG. 4 described hereinabove is connected to the magnetically isolated analog and digital supply which is shown as the extreme righthand end of FIG. 3A and the bidirectional communication bus 20 is supplied by the five volt field supply.

Note that on each of optocouplers 27 one element of the coupler is connected to a field supply and the supply common ground while the other element of the coupler is connected to the analog and digital supply and the analog and digital ground. One line 77 from control bus 55 drives optocoupler 27c. When line 77 is high, point 78 will go high turning on transistor 79 which grounds point 80. This condition is established whenever controller 35 determines that the particular FID shown in FIG. 4 is going to transmit a word from UART 28 onto bidirectional communication bus 20. The grounding of point 80 disables the receiver amplifier 81 of differential line transceiver 26. As is indicated on FIG. 4, the preferred embodiment of differential line transceiver 26 is a type SN75116 integrated circuit differential line transceiver currently manufactured by Texas Instruments Inc. of Dallas, Tex. Note also that when point 78 goes hight the DE input to transceiver 26 goes high which enables the transmit amplifier of the transceiver.

As shown in FIG. 4, the preferred embodiment of bidirectional communication bus 20 includes a pair of differential lines for transmission (TO, negated TO) and a receive differential pair (RD, negated RD). It will thus be appreciated that the preferred embodiment of bidirectional communication bus 20 is full duplex. As indicated hereinabove it is preferred to arrange bidirectional communication bus 20 according to EIA revised standard 422-A. However it should be noted that provision is made for a pair of jumpers 82 which will tie the respective differential pairs together thus establishing a half duplex system on communication bus 20.

The output of receive amplifier 81 is connected via line 85 to the photodiode of optocoupler 27a, the output of which is connected along line 86 to the receive register input (RRI) of UART 28. The serial output of UART 28 appears at the transmit register output (TR0) of the UART and is connected by line 87 to transistor 88 which controls the photodiode of optocoupler 27b. The output of optocoupler 27b is connected via line 89 to the transmit amplifier 90 of transceiver 26.

It will thus be appreciated that optocouplers 27a-27c provide complete optical isolation between the controller 35 and UART 28 of the FID on one side and bidirectional communication bus 20 on the other side. Note that the differential pairs of bus 20 are surge protected by transzorbs 91a-91f connected to the supply common ground, and protected against surges of differential voltage across each pair and between the case ground by gas tubes 92a and 92b.

As described hereinabove the preferred embodiment of the present invention performs an analog to digital conversion of the outputs of various transducers which measure various parameters of each tank locally at the FID. This function is performed in the preferred embodiment by A to D converter 26 which is preferably a type ICL7109 twelve bit dual slope integrating analog to digital converter currently manufactured by Intersil Inc. of Cupertino, Calif. The output of A to D converter 36 appears on an eight bit bus 95 which is directly connected to data bus 30. It will be understood that four bit control bus 96 controls the conversion cycle of converter 36 as well as control of the multiplexing of the twelve bit output of the converter onto eight bit bus 95.

From FIG. 4 it may be appreciated that all eight bits of the second quasi bidirectional port (P20–P27) of controller 35 are dedicated to control of the analog to digital converter 36 with the exception of lines 65 and 77. A to D converter 36 includes a reference voltage input which appears on line 97 and an analog input pair comprising lines 98 and 99.

It is to be appreciated that any notation on FIG. 4 indicating that a line goes to FIG. 6 or is received from FIG. 6 should be understood to be connected to either of the embodiments of the analog multiplexing and transducer arrangements shown in FIGS. 6A and 6B. It is therefore to be understood that the embodiments shown in FIGS. 6A and 6B are substitutional in nature.

From the foregoing it should be appreciated that controller 35 controls through data bus 30 and control buses 52 and 55 all communication within the preferred embodiment of the field interface device as well as communication with bidirectional communication bus 20 which takes place through UART 28. It will further be appreciated that each FID constructed according to FIG. 4 will have a unique and predetermined address determined by address selector 56 and that the state of the bits established on bus 57 by selector 56 will always be compared to an incoming address word from UART 28 to ascertain if a particular instruction is intended for the particular FID.

It will further be appreciated that the local conversion of the analog output of tank parameter transducers provides an accuracy that is only limited by the accuracy of the transducer itself and any environmental conditions local to the tank. By performing local analog to digital conversion the accuracy of the reading of each transducer is not a function of the distance that the particular transducer is from control location 18 (FIG. 1).

It should further be appreciated that controller 35 is programmed to convert all data being transmitted to UART 28 onto bidirectional communications bus 20 into U.S. ASCII code.

It should further be appreciated that controller 35 is programmed to treat each output word from the receive buffer of UART 28 as one character of ASCII code and therefore all communications between the preferred embodiment of the FID shown in FIG. 4 and control location 18 shown in FIG. 1 may be accomplished via a dumb terminal at the control location.

This arrangement leads not only to a simple scheme of communicating but also to a large measure of interchangeability of terminal equipment communicating with each FID. It should further be appreciated that a large variety of computers may be used at control location 18 (FIG. 1) so long as their output is programmed to generate ASCII code characters and is attached to an appropriate serial interface for connection with bidirectional communication bus 20.

Figure 5:
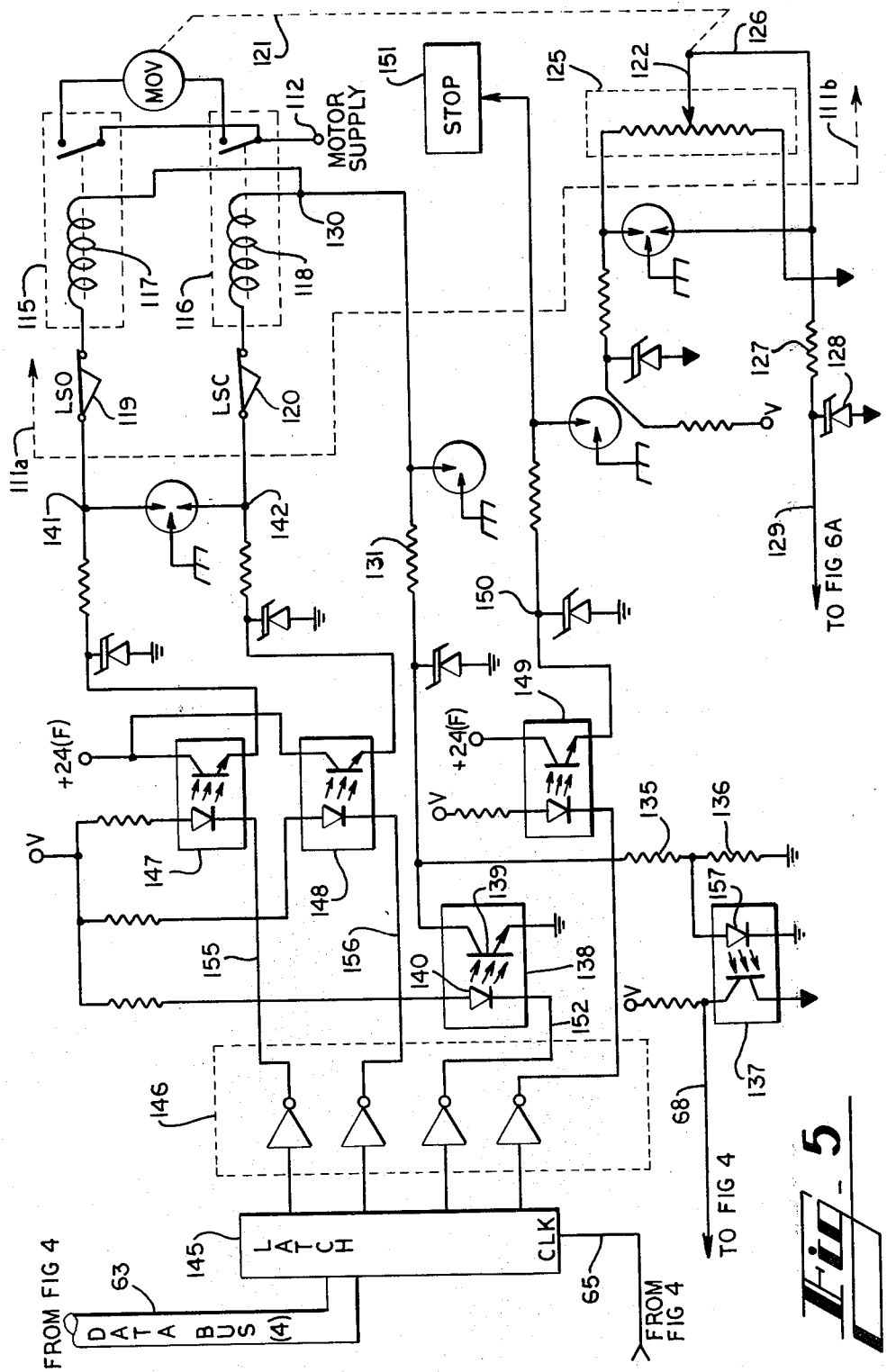
FIG. 5 is a schematic diagram of the preferred embodiment of the control and monitoring circuit for fluid control devices of the present invention.

Turning next to FIG. 5, the novel arrangement for monitoring and controlling electromechanical fluid control devices of the present invention may be seen in its preferred embodiment. As shown in FIG. 5, by way of example, a motor operated valve 110 is one such fluid control device which will be present on an existing fluid storage tank to which the preferred embodiment of the present invention is to be connected. It should also be appreciated that a pump or any other device used to control the flow of the stored liquid into or out of the tank may be used in connection with the apparatus shown on FIG. 5 without departing from the scope of the present invention.

A dashed line, the ends of which are denoted as 111a and 111b shown on FIG. 5 indicates the interface between conventional preexisting devices to be monitored and controlled (on the right side of FIG. 5) and the preferred embodiment of the present invention.

In the example of motor operated valve 110 shown in FIG. 5, a terminal 112 labeled "motor supply" represents any existing supply of electrical current to operate valve 110 in one of its two possible operational directions. Conventionally the motor associated with valve 110 will be a direct current motor which is reversible by changing the polarity at its input terminals.

Conventionally motor operated valve 110 will be controlled by a pair of relays 115 and 116. It is to be understood that closure of relay 115 which is activated when a sufficient pull-in current is provided through coil 117 will cause motor operated valve 110 to move toward its open position. Likewise sufficient pull-in current through coil 118 of relay 116 will cause motor operated valve 110 to move toward its closed position.

It is to be understood that a pair of normally closed limit switches 119 and 120 are in series with coils 117 and 118, respectively, and terminate current to these coils when valve 110 reaches either one of its extreme positions. In FIG. 5, limit switch 119 opens when valve 110 reaches its fully open position and limit switch 120 opens when the valve reaches its fully closed position. It is to be understood that limit switches 119 and 120 are mechanically connected to moving parts of valve 110 by an arrangement which is not shown and is conventional in nature.

A dashed line 121 indicates a mechanical connection between motor operated valve 110 and the wiper 122 of potentiometer 125. It is to be understood that potentiometer 125 is a conventional position indicating potentiometer which serves as a voltage divider to establish a voltage on line 126 which is indicative of the position of the valve. Line 126 is connected through a resistor 127 which is shunted to analog and digital ground via a transzorb 128 to line 129, the function of which will be explained herein in connection with FIG. 6A.

As was noted hereinabove, prior art systems have monitored the voltage from wiper 122 of valve position potentiometers similar to potentiometer 125 via analog connections back to a control location. The inventors believe that heretofore no field interface device designed for monitoring tank parameters has also included an arrangement which can, over the same communication bus, control devices such as motor operated valve 110 as well as ascertain the state of limit switches 119 and 120.

Note that as a conventional arrangement the ground side of each of coils 117 and 118 are tied to point 130. Point 130 is connected through a high power small value resistor 131 whose primary function is to dissipate power in the event of a large surge in the system to point 132.

Point 132 is connected to ground via a voltage divider comprising resistors 135 and 136, each of which, in the preferred embodiment, is of equal value and on the order of approximately 4.7 kilohms. Note that resistor 136 is shunted by the photodiode 157 of an optocoupler 137.

Point 132 may alternately be connected to ground through the phototransistor 139 of optocoupler 138.

It will thus be appreciated that point 132 comprises the grounding point for each of relay coils 117 and 118. It should further be noted that points 141 and 142 are, respectively, the input points at which the control voltage for operating coils 117 and 118 are to be applied. It will thus be appreciated that points 141 and 132 comprise a portion of a two-wire circuit for operating relay coil 117 which comprises an operating means for activating motor operated valve 110. It will further be appreciated that said two-wire circuit latches limit switch 119 in series therewith.

Similarly points 142 and 132 comprise a second two-wire circuit for operating relay 116 which comprises an operating means for operating valve 110 in a particular direction and this two-wire circuit is also in series with a limit switch, 120.

It should be understood that the combination of circuitry controlling optocoupler 138 and resistors 135 and 136 provide a novel and simple means for establishing one of two impedance states controlling the impedance between point 132 and ground. It will be appreciated by those skilled in the art that the dark resistance associated with phototransistor 139 of optocoupler 138 is on the order of several megohms and therefore when photodiode 140 is nonconducting, transistor 139 may be considered removed from the circuit. It will further be appreciated that when photodiode 140 is driven fully that transistor 139 will saturate thus effectively shunting resistors 135, 136 and optocoupler 137, thereby providing a low impedance path to ground from point 132.

As may be seen in FIG. 5, a four bit tap 63 from data bus 30 of controller 35 is provided as the input to a latch 145 which is clocked to latch inputs from tap 63 onto the outputs of latch 145 upon a positive transition on line 65. The four bit output of latch 145 provided to a quad inverting buffer 146. The outputs of buffer 146 each drive the photodiode of one of four optocouplers 138, 147, 148, and 149. For each of these optocouplers the photodiode side is connected to the analog and digital five volt supply and the phototransistor associated with each optocoupler is driven from the twenty-four volt field supply. It will therefore be appreciated that optocouplers 138 and 147–149 provide optical isolation between the analog and the digital circuitry of the FID and the conventional preexisting circuitry shown to the right of line 111a–111b.

The output of optocoupler 149 is provided to line 150 which in turn is provided to a block 151 labeled "stop". It is to be understood that when the transistor of optocoupler 149 is turned on, block 151 represents a conventional emergency stop function associated with motor operated valve 110. In all other normal operations a logical one will be provided as the output of the particular inverting buffer connected to the cathode of the photodiode of coupler 149 and thus the stop function will not be activated.

Optocoupler 138, as described hereinabove controls impedance between point 132 and ground. Optocouplers 147 and 148 drive points 141 and 142, respectively, and thus control relays 115 and 116, respectively.

Consider for a moment that the word in latch 145 causes photodiode 140 of optocoupler 138 to conduct thus effectively grounding point 132. A logical zero on one of lines 155 or 156 will activate the associated one of optocouplers 147 or 148. Consider for example that it is desired to move motor operated valve 110 toward its open position. Therefore a logical zeroes will be provided to lines 152 and 155 thus establishing a current path through point 141, coil 117 to point 130 and on to point 132 and thus to ground through phototransistor 139. The low impedance path to ground through transistor 139 allows sufficient current to flow through this two-wire circuit to pull in relay 115 and thus operate motor operated valve toward its open position.

It will similarly be appreciated that logical zeros on lines 156 and 152 will supply sufficient current to coil 118 to operate relay 116 thus moving motor operated valve 110 toward its closed position. It will therefore be appreciated that optocouplers 138, 147 and 148 provide sufficient isolation to prevent interaction between the twenty-four volt field supply and the five volt analog and digital supply but still allow the preferred embodiment of the present invention to operate a fluid control device such as valve 110.

Next consider the situation in which a logical one is provided on line 152 thus extinguishing photodiode 140 and a logical one is provided on line 155. In these circumstances a current path is established from the twenty-four volt field supply through point 141 and coil 117 to point 130 and on to point 132. From there the current path travels through resistor 135 and the parallel combination of resistor 136 and photodiode 157. Due to the presence of resistor 135 in this circuit the current in this loop under the conditions described will be on the order of a few milliamps. Conventionally relays such as relays 115 and 116 associated with valve 110 require currents about an order of magnitude greater than this to pull in and thus while current will flow through the coils, the current will be insufficient to create the necessary magnetic field to actuate these relays. It will be appreciated that the value of resistor 135 may be selected in order to assure that, with photodiode 140 darkened, the current in the loop will be insufficient to pull in the relay.

Note however that the current through the above described loop will be sufficient to activate photodiode 157 and thus operate the phototransistor of coupler 137 pulling line 68 low. Note from FIG. 4 that line 68 is provided to one bit of data bus 30 through three state buffers 61 and thus the logical condition on this line may be read under the control of controller 35. The activation of photodiode 157 under the conditions described indicates that limit switch 119 is closed because of the fact the current is flowing through the loop to activate diode 157. If motor operated valve 110 were at its fully open position when logical zeros were present on lines 152 and 155, limit switch 119 would be open and no current would flow through photodiode 157. Therefore under these conditions line 68 would be at a logical one state indicating that limit switch 119 was open.

It will be apparent that the combination of a logical zero on line 152 and a logical zero on line 156 provides an analogous scheme for testing the state of limit switch 120 to ascertain if motor operated valve 110 is fully closed.

From the foregoing it will be appreciated that each of the two-wire circuits described hereinabove between points 141 and 132 and points 142 and 132 are used both for operating relays 115 and 116 (when phototransistor 139 is on) and for testing the state of limit switches 119 and 120 without affecting relays 115 and 116 when phototransistor 139 is off. It will therefore be appreciated that optocoupler 138 provides a switching means which is selectively operable for providing a first impedance state in one of the above described two-wire circuits when transistor 139 is on. In this state an operating voltage supplied from one of optocouplers 147 and 148 will operate one of the relays associated with valve 110.

It will further be appreciated that when a second impedance state is provided at point 132 by turning off transistor 139 that the application of the operating voltage at one of points 141 or 142 will not operate one of the relays but can be used through optocoupler 137 to test the state of limit switches 119 and 120. It will thus be appreciated that the circuitry of FIG. 5 provides a novel and simple apparatus which may be directly connected to existing fluid control devices and which, through the same two-wire circuit, may both operate a fluid control device and test the state of a limit switch in series with the device over the same two wires.

FIGS. 6A and 6B show alternative embodiments of circuitry connected to analog multiplexer 40 shown in FIG. 2. It is of course possible to select other analog inputs to multiplexer 40 or to combine combinations of those shown in FIGS. 6A and 6B. The apparatus shown in FIG. 6A and 6B is a scheme for multiplexing various analog outputs from transducers conventionally associated with each fluid storage tank onto lines 98 and 99 which are shown in FIG. 4 as the analog input to A to D converter 36.

In FIG. 6A, the first preferred embodiment is shown wherein three tank parameters are measured by three tank parameter transducers and the analog outputs thereof are multiplexed onto lines 98 and 99.

The preferred embodiment of the present invention uses a type 4052 CMOS analog multiplexer currently manufactured by several semiconductor manufacturers, including RCA. It will be appreciated that the 4052 is a differential analog multiplexer which connects one of a pair of outputs 0X,0Y; 1X,1Y; . . . 3X,3Y to outputs X,Y. The particular pair which is connected to the XY output is selected by lines 66 and 67 shown in FIG. 6A. As may be seen from FIG. 4, lines 66 and 67 are two lines from eight bit control bus 55 from the P20-P27 quasi bidirectional port of controller 35. It will thus be appreciated that the particular analog input from multiplexer 40 which is provided to the output on lines 98 and 99 is under the control of controller 35.

In the first preferred embodiment of the tank parameter transducers as shown in FIG. 6A, conventional circuitry is provided to establish a reference voltage on line 97. This is indicated on FIG. 6A as reference voltage source 158. Also a conventional one milliamp current source shown as 159 is provided to drive a constant current through resistance temperature device 160. Block 161 on FIG. 6A indicates that resistance temperature device 160 and pressure transducer 162 are located within the particular tank with which the preferred embodiment of the FID is associated. The voltage drop across RTD 160 appears between lines 165 and 166 and is inverted and amplified by an operational amplifier 167, the output of which appears at point 168. Resistors 169 and 170 form a voltage divider which divides the difference between the reference voltage on line 97 and the voltage at point 168 and provides this voltage as an input at point 171 to a second operational amplifier 172. The output of amplifier 172 appears at point 175. The voltage difference between point 175 and ground comprises the zero XY pair on the inputs to multiplexer 40.

The one input pair to multiplexer 40 is provided as a voltage difference between the analog and digital ground and line 129. Referring to FIG. 5 it may be seen that line 129 carries the voltage on the wiper 122 of position potentiometer 125 associated with motor operated valve 110. It will therefore be appreciated that the analog input to the one XY pair provides an indication of the position of motor operated valve 110 which may then be provided along lines 98 and 99 to A to D converter 36 to be converted to a digital word to be transmitted back to the control location indicative of the valve position.

Also pressure transducer 162 within the tank as defined by block 161 provides the two input to analog multiplexer 40. It will thus be appreciated that a variety of analog signals indicative of the value of tank parameters are continuously multiplexed on lines 98 and 99 where these analog voltages are converted to digital voltages by A to D converter 36 (FIG. 4) to eventually be transmitted onto bidirectional communication bus 20 back to control location 18 (FIG. 1).

An alternate embodiment of multiplexer of analog signals to A to D converter 36 is shown in FIG. 6B. It is to be understood that all devices referenced with the same numerals on FIGS. 6A and 6B are identical and analogous. As may be seen from inspection of FIG. 6B, this embodiment differs from the embodiment of FIG. 6A in two main respects. The first is that the embodiment of FIG. 6B shows a tank 161 with a plurality, in this case four, resistance temperature devices spaced vertically within the tank. The second difference is that the amplifying arrangement comprising amplifiers 167 and 172 for providing an analog voltage at point 175 indicative of the output of a particular resistance temperature device is connected to the output of multiplexer 40 rather than to one of the inputs.

As described hereinabove, some preexisting tank facilities include a plurality of resistance temperature devices such as RTDs 176-179 spaced vertically within the tank so that temperature readings may be obtained from a particular portion of the fluid in the tank when the fluid is at various levels. As also noted hereinabove, prior art tank monitoring facilities included mechanical trip switches which were activated by a float in order to select the RTD being read.

The alternate preferred embodiment of FIG. 6B shows a novel and more reliable scheme for taking advantage of the plurality of vertically spaced RTDs 176-179.

In particular, through the address selected on a select lines 66 and 67, any particular one of RTDs 176-179 may be read under the control of controller 35.

Furthermore it allows controller 35, in response to commands from the control location transmitted over bus 20 to provide an average reading of the temperature indications from the respective RTDs 176-179.

Note again that a conventional constant current source 159 drives a predetermined current, preferably one milliamp, through all of RTDs 176–179. Each of RTDs 176–179 has one two-wire pair 186–189, respectively, attached to cross its terminals and each of these pairs is provided as one of the inputs to analog multiplexer 40. Under the control of select lines 66 and 67 the output from one of pairs 186–189 is provided on output pair 190 connected to the XY outputs of multiplexer 40. For each RTD, the output of which is connected to pair 190, an analog voltage will be provided between lines 98 and 99 indicative of the temperature at that particular vertical location within the tank.

It is to be understood that controller 35 contains in memory an indication of the possible ranges for the output voltages generated in response to RTDs 176–179. Controller 135 is arranged to discard any reading from one of RTDs 176–179 which is out of range and therefore a major problem which arose in prior art systems of multiple RTDs spaced vertically in the tank is eliminated. This problem is one that arose when a particular one of the plurality of RTDs failed and the fluid level in the tank was such that the failed RTD is the one selected for reading. In prior art systems there was no way short of entering the tank to override this situation and it effectively left the control location blind to the temperature within that particular tank.

By using the arrangement of FIG. 6B, it is possible to either select particular ones of RTDs 176–179, to selectively ignore an out of range reading, and to provide an average indication of the temperature based on the various temperature occurring vertically within the tank.

It will be appreciated from the foregoing description of the preferred embodiment of the present invention that the present invention is not only useful in petroleum products storage facilities but will find other uses in different types of fluid storage systems. It will further be apparent that based on the foregoing description of the preferred embodiment, other embodiments of the present invention may be constructed within the scope of the claims below.

We claim:

1. In a system for monitoring tank parameters at a control location in a fluid storage faciity including at least one tank including a parameter transducer associated therewith for providing a transducer output signal in response to a physical parameter of said tank including a field supply of electric power;
   a controller means at said control location for providing an interrogation signal
   a duplex communication link connecting said control location and a field interface means at said tank for providing to said duplex communication link a parameter reading signal corresponding to said transducer output signal in response to each occurrence of said interrogation signal on said duplex communication link;
   said field interface means including a transmitter/receiver including an input line and an output line; an improved arrangement for connecting said field interface means to said duplex communication link comprising in combination:
   converter means connected to said field supply of electric power for providing an FID power supply pair for providing a source of electric power to said field interface means at a constant voltage which is magnetically isolated from said field supply of electric power;
   first optocoupler means connecting said input line to said duplex communication link comprising a light emitting source powered from said field supply of electric power and a light responsive switching device connected to said input line and being optically coupled to said light emitting device and powered from said FID power supply pair;
   a second optocoupler means connecting said output line to said duplex communication link comprising a light emitting source powered from said FID power supply pair and a light responsive switching device connected to said duplex communication link and being optically coupled to said light emitting device and powered from said field supply of electric power; and
   surge protection means shunting said field supply of electric power and earth ground.

2. The improvement of claim 1 wherein said field interface means includes a processor including an output port with at least one bit line for providing an output signal in response to said field interface means generating a transmit signal condition, and further comprises tristate line transceiver means, interposed between said first and second optocoupler means and said duplex communication link, including a pair of tristate control output lines; a third optocoupler means including a light emitting source powered from said FID power supply pair and connected to a switch controlled by said bit line, and a light responsive switching device optically coupled to said light emitting device and powered from said field supply of electric power and connected to said tristate control lines.

3. The improvement of claim 1 wherein said duplex communication link comprises a balanced transmit pair and a balanced receive pair.

4. The improvement of claim 3 wherein said surge protection means further comprises means connected to said duplex communication link at a first plurality of connection points shunting said balanced transmit pair and said balanced receive pair, and connected to each conductor of said balanced transmit pair and said balanced receive pair to said earth ground at a second plurality of connection points for conducting current when a voltage exceeding a predetermined breakdown voltage is impressed between two of said connection points.

5. The improvement as recited in claim 4 wherein said predetermined breakdown voltage is a first predetermined breakdown voltage and said surge protection means further comprises means connecting each conductor of said balanced transmit pair and each conductor of said balanced receive pair, to a ground of said field supply of electric power at a third plurality of connection points for conducting current when a voltage exceeding a second predetermined breakdown voltage is impressed between two of said third plurality of connection points.

* * * * *